United States Patent
Zhao et al.

(10) Patent No.: US 11,298,777 B2
(45) Date of Patent: Apr. 12, 2022

(54) POWDER-ENHANCED FRICTION STIR RIVET WELDING DEVICE AND METHOD

(71) Applicant: XI'AN JIAOTONG UNIVERSITY, Shaanxi (CN)

(72) Inventors: Shengdun Zhao, Shaanxi (CN); Peng Zhang, Shaanxi (CN); Yongfei Wang, Shaanxi (CN); Jingxiang Li, Shaanxi (CN); Shuqin Fan, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/363,406

(22) Filed: Jun. 30, 2021

(65) Prior Publication Data

US 2021/0402503 A1   Dec. 30, 2021

(51) Int. Cl.
*B23K 20/00* (2006.01)
*B23K 20/12* (2006.01)

(52) U.S. Cl.
CPC .......... *B23K 20/128* (2013.01); *B23K 20/123* (2013.01); *B23K 20/1255* (2013.01)

(58) Field of Classification Search
CPC .. B21J 15/12; B21J 7/42; B24B 23/03; B23D 51/16; B23D 67/06; B23K 11/0066; B23K 20/12; B23K 20/1295
See application file for complete search history.

(56) References Cited

U.S. PATENT DOCUMENTS

| | | | | |
|---|---|---|---|---|
| 2,902,891 A * | 9/1959 | Wollenhaupt | ............ | B23Q 5/32 173/4 |
| 3,762,199 A * | 10/1973 | Yoshikawa | .............. | B21J 15/12 72/67 |
| 4,308,738 A * | 1/1982 | Yoshida | .................... | B21J 15/12 408/135 |
| 5,119,659 A * | 6/1992 | Yamada | .................... | B21J 15/12 408/14 |
| 6,569,002 B2 * | 5/2003 | Smith | ..................... | B24B 23/04 451/349 |

FOREIGN PATENT DOCUMENTS

| | | |
|---|---|---|
| CN | 104640649 A | 5/2015 |
| CN | 106112543 A | 11/2016 |
| CN | 109108207 A | 1/2019 |
| EP | 1281468 A2 | 2/2003 |
| JP | 2020063801 A | 4/2020 |

* cited by examiner

*Primary Examiner* — Erin B Saad

(57) ABSTRACT

A powder-enhanced friction stir rivet welding device includes a friction stir rivet welding spindle, a C-shaped frame and a tooling platform. The friction stir rivet welding spindle includes a rotating mechanism, a feed mechanism, a vibration-rotation mixing mechanism and a powder feeding mechanism. The friction stir rivet welding spindle is configured to realize rotation and feed movements of a rivet and feeding and mixing of a powder. The C-shaped frame is configured to fix the friction stir rivet welding spindle and the tooling platform. The tooling platform includes a force sensor, a sensor indenter, a tooling mould and a tooling platen. The tooling platform is configured to clamp a workpiece to be riveted and welded, and measure a rivet welding force of the friction stir rivet welding spindle in real time.

10 Claims, 9 Drawing Sheets

POWDER-ENHANCED FRICTION STIR RIVET WELDING DEVICE AND METHOD

CROSS-REFERENCE TO RELATED APPLICATIONS

This application claims the benefit of priority from Chinese Patent Application No. 202010618363.7, filed on Jun. 30, 2020. The content of the aforementioned application, including any intervening amendments thereto, is incorporated herein by reference in its entirety.

TECHNICAL FIELD

This application relates to joining of sheets, and more particularly to a powder-enhanced friction stir rivet welding device and method.

BACKGROUND

The joining between lightweight sheets of the same material, dissimilar materials, the same thickness or different thicknesses has been extensively investigated as comprehensive performances of the mechanical equipment in aerospace, transportation and petrochemical fields have been continuously improved and the lightweight and integrated equipment has been continuously designed.

In the prior art, the lightweight sheets are joined mainly by a riveting method or a friction stir spot welding (FSSW) method. In the riveting process, a mechanical lock is formed to achieve the spot joining between the lightweight sheets or between the lightweight sheet and a rivet based on a plastic deformation ability of the metal. However, the formed riveting joint has low connection strength, large rivet forming force and poor air tightness and appearance quality. With respect to the FSSW method, a metallurgical joint is formed between plasticized metal materials under the friction stir and extrusion action between a welding tool and the metal materials to achieve the metallurgical joining. Unfortunately, the traditional FSSW method struggles with keyhole defects, and although a refill FSSW method can overcome the keyhole defects, it still has hook defects, thereby affecting strength of the metallurgical joining.

SUMMARY

An object of this application is to provide a powder-enhanced friction stir rivet welding device and method to solve problems in the prior art. This application integrates technical advantages of solid-phase welding, riveting and composite material processing. In addition, this application realizes the powder-enhanced friction stir rivet welding between lightweight sheets of the same material or dissimilar materials at room temperature, and can obtain a friction stir rivet welding joint with a rivet, which is free of keyhole defects, and has good forming quality and high joining strength. Compared to the traditional riveting, this application has a smaller rivet welding forming force, higher efficiency, simpler operation and lower energy consumption.

Technical solutions of the present disclosure are described as follows.

In a first aspect, this application provides a powder-enhanced friction stir rivet welding device, comprising:
a friction stir rivet welding spindle;
a C-shaped frame; and
a tooling platform;
wherein the friction stir rivet welding spindle comprises a rotating mechanism, a feed mechanism, a vibration-rotation mixing mechanism and a powder feeding mechanism; and the friction stir rivet welding spindle is configured to realize rotation and feed movements of a rivet and feeding and mixing of a powder;

the C-shaped frame is configured to fix the friction stir rivet welding spindle and the tooling platform; and the tooling platform comprises a force sensor, a sensor indenter, a tooling mould and a tooling platen; and the tooling platform is configured to clamp a workpiece to be riveted and welded, and measure a rivet welding force of the friction stir rivet welding spindle in real time.

In an embodiment, the rotating mechanism comprises a hollow spindle, a lower bearing mechanism, a first servo motor and an upper bearing mechanism; wherein the hollow spindle is fixed in a vertical direction by the lower bearing mechanism and the upper bearing mechanism; rotation of the hollow spindle is driven by the first servo motor; the first servo motor is a hollow inner rotor motor; and a rotor of the first servo motor is in a spline fit with the hollow spindle for transmission through a keyway of the rotor of the first servo motor.

In an embodiment, the feed mechanism comprises a hollow ball screw, a screw nut, a fixing sleeve of the screw nut, a synchronous belt, a second servo motor and a lower linear bearing; and transmission between the second servo motor and the fixing sleeve of the screw nut is performed by the synchronous belt; when the powder-enhanced friction stir rivet welding device performs a feed movement, the second servo motor rotates to drive the screw nut to rotate, so that the hollow ball screw moves in the vertical direction; at the same time, the hollow ball screw is mechanically connected to the hollow spindle and the upper bearing mechanism of the rotating mechanism; the hollow spindle is in spline fit with the rotor of the first servo motor; and the lower linear bearing is provided at an outer side of the lower bearing mechanism of the hollow spindle, such that and the hollow ball screw drives the hollow spindle to reciprocate in the vertical direction.

In an embodiment, the vibration-rotation mixing mechanism comprises a mixing screw rod, a mixing power source and a support bearing; wherein the vibration-rotation mixing mechanism is configured to perform a vibration mixing and a rotation mixing; when the mixing power source is a vibration exciter, and the support bearing is a linear bearing, the vibration exciter drives the mixing screw rod to reciprocate up and down in a form of high-frequency vibration; at the same time, the hollow spindle rotates to realize the vibration mixing of the powder in a cavity of the hollow spindle; when the mixing power source is a third servo motor, and the support bearing is a rolling bearing, the third servo motor drives the mixing screw rod to rotate in a rotation direction opposite to a rotation direction of the hollow spindle, so as to realize the rotation mixing of the powder in the cavity of the hollow spindle.

In an embodiment, the powder feeding mechanism comprises an air compressor, a powder feeding pump, a reinforced powder bin, a base material powder bin and a pipeline; and the air compressor drives the powder feeding pump to feed a reinforced powder in the reinforced powder bin and a base material powder in the base material powder bin into the cavity of the hollow spindle through the pipeline.

In a second aspect, this application further provides a powder-enhanced friction stir rivet welding method using the device, comprising:

(1) fastening an upper sheet and a lower sheet by clamping followed by stacking on a tooling mould; matching a rivet with a shoulder of a hollow spindle followed by placing on a point to be riveted and welded; applying a pre-tightening force to the rivet and the point to be riveted and welded through the hollow spindle; transporting a reinforced powder in a reinforced powder bin and a base material powder in a base material powder bin into a cavity of the hollow spindle through the pipeline using a powder feeding pump; and at the same time, mixing the reinforced powder with the base material powder in the cavity of the hollow spindle through vertical vibration or rotation of a mixing screw rod to obtain a mixed powder;

(2) allowing a rotor of a first servo motor to drive the hollow spindle to rotate, such that the rivet performs local friction preheating on the point to be riveted and welded, wherein the first servo motor is a hollow-shaft servo motor;

(3) keeping the rotor of the first servo motor rotating; driving, by a second servo motor, a hollow ball screw to move downwards, so that the rivet under rotation is inserted into the upper sheet; injecting the mixed powder through a central through hole of the rivet; and fully mixing the mixed powder and a metal material at the point to be riveted and welded under friction stir of the rivet, such that the mixed powder and the metal material at the point are plasticized under an action of friction heat;

(4) allowing the rivet to continuously move downwards until a shoulder of the rivet is inserted into the upper sheet; applying, by the second servo motor, an upsetting force to the rivet; allowing the rivet to continuously rotate to perform friction stir on the point to be riveted and welded for 5-20 seconds using the rivet and the shoulder of the rivet; stopping rotation of the first servo motor after the mixed powder and the metal material at the point to be riveted and welded are fully extruded and mixed; and naturally cooling the metal material to enable the metal material to solidify with the rivet to obtain a rivet welding joint, so as to realize powder-enhanced friction stir rivet welding of the upper sheet and the lower sheet; and (5) after the point to be riveted and welded is cooled and solidified, driving, by the second servo motor, the hollow ball screw to move upwards, so as to drive the hollow spindle to retract to an initial position and finish a friction stir rivet welding process.

In an embodiment, in step (1), a counter bore is preprocessed in a center of the point to be riveted and welded on the upper sheet; and a position of the counter bore corresponds to that of the central through hole of the rivet.

In an embodiment, the upper sheet and the lower sheet are lightweight sheets made of the same material or dissimilar materials; and a thickness of the upper sheet is the same as or different from that of the lower sheet.

In an embodiment, the rivet is made of die steel, tool steel, high-speed steel or cemented carbide; a stirring pin of the rivet has a conical structure, a conical threaded structure, a three-plane conical threaded structure, a cylindrical structure, a cylindrical threaded structure or a three-plane cylindrical threaded structure; and the shoulder of the rivet has a planar structure, a concave structure, a concentric ring structure or a spiral line structure.

In an embodiment, the reinforced powder is multi-walled carbon nanotube, graphene nanosheet or titanium powder; the base material powder comprises a first base material powder and a second base material powder; a material of the first base material powder is the same as that of the upper sheet, and a material of the second base material powder is the same as that of the lower sheet; the base material powder has a particle size of 300-2000 mesh; and a volume percentage of the reinforced powder in the mixed powder is 1-10%.

Compared to the prior art, this disclosure has the following beneficial effects.

(1) Good Forming Effect and Small Forming Force

With respect to the powder-enhanced friction stir rivet welding device provided herein, the rivet welding joint integrates the technical advantages of solid-phase welding, riveting and composite material processing, and also integrates mechanical and metallurgical performances, which makes it equivalent to or even better than aluminum alloy base materials in tensile and shear performances. A threaded rivet is used as a stirring pin to be filled in the rivet welding joint to obtain a smooth and beautiful rivet welding joint. A combination of micro-forging effect of the threaded rivet on the sheets and the metallurgical interfaces makes the rivet welding joint have better air tightness. Through friction between a welding tool and multilayer sheets, the mixed powder and the multilayer sheets are heated to reach a thermoplastic state, reducing the forming force compared to a cold-forming device.

(2) Long Service Life and High Production Efficiency

The rivet instead of the welding tool is used to perform friction stir on the multilayer sheets, which can effectively reduce friction loss of the welding tool and the processing difficulty and extend the service life of the welding tool. Compared to the traditional riveting device, the powder-enhanced friction stir rivet welding device provided herein does not need to drill the sheet before the formation of the rivet welding joint, which leads to a simplified process. Therefore, the device disclosure herein improves the automation degree of the friction stir rivet welding process and also has low production cost and high production efficiency.

(3) Dispersed Multiple Power Sources

Three servo motors are respectively configured to realize the rotation of a stirring sleeve, rotation of the stirring pin and pressing movement of the stirring pin, which can diminish a scale of a transmission mechanism, improve energy utilization efficiency, lower the cost and simplify the structure compared to a single power source. Moreover, these movements can be performed alone or simultaneously, allowing for a better processing performance and a wider adaptability.

(4) The Powder-Enhanced Friction Stir Rivet Welding Device Provided Herein employs a servo motor for direct drive instead of the traditional hydraulic transmission and pneumatic transmission mechanism. The servo motors used herein have high precision, fast response, good high-speed performance, strong anti-overload capability and stable low-speed operation, which can meet the requirements of the friction stir rivet welding for rotation speed. The servo motors directly drives the stirring pin and the stirring sleeve to realize the rotation and punching movements, so that there is no need for a redundant transmission mechanism, improving the mechanical efficiency and reducing the failure rate.

In these drawings: 1, friction stir rivet welding spindle; 2, C-shaped frame; 3, tooling platform; 301, force sensor; 302, sensor indenter; 303, tooling mould; 304, tooling platen; 305, upper sheet; 306, lower sheet; 307, counter bore; 308, rivet welding joint; 4, rivet; 401, stirring pin; 402, shoulder of rivet; 403, central through hole; 404, matching boss; 5, rotating mechanism; 501, hollow spindle; 502, lower bearing mechanism; 503, first servo motor; 504, upper bearing mechanism; 505, rotor of first servo motor; 506, spline of hollow spindle; 507, keyway of rotor of first servo motor; 508, hollow spindle cavity; 509, lower bearing; 510, lower bearing base; 511, stator of first servo motor; 512, upper bearing base; 513, upper bearing; 6, feed mechanism; 601, hollow ball screw; 602, fixing sleeve of screw nut; 603, screw nut; 604, synchronous belt; 605, second servo motor; 606, lower linear bearing; 7, vibration-rotation mixing mechanism; 701, mixing screw rod; 702, mixing power source; 703, support bearing; 704, through hole of hollow spindle; 8, powder feeding mechanism; 801, powder feeding pump; 802, reinforced powder bin; 803, base material powder bin; 804, pipeline; and 805, air compressor.

DETAILED DESCRIPTION OF EMBODIMENTS

The present application will be further described in detail below with reference to the accompanying drawings and embodiments to make the objects, technical solutions and advantages better understood. Obviously, the described embodiments are merely illustrative, and are not intended to limit the scope of the application. Other embodiments made by those of ordinary skill in the art based on the content disclosed herein without paying any creative effort shall fall within the scope of this application.

Figure 4:
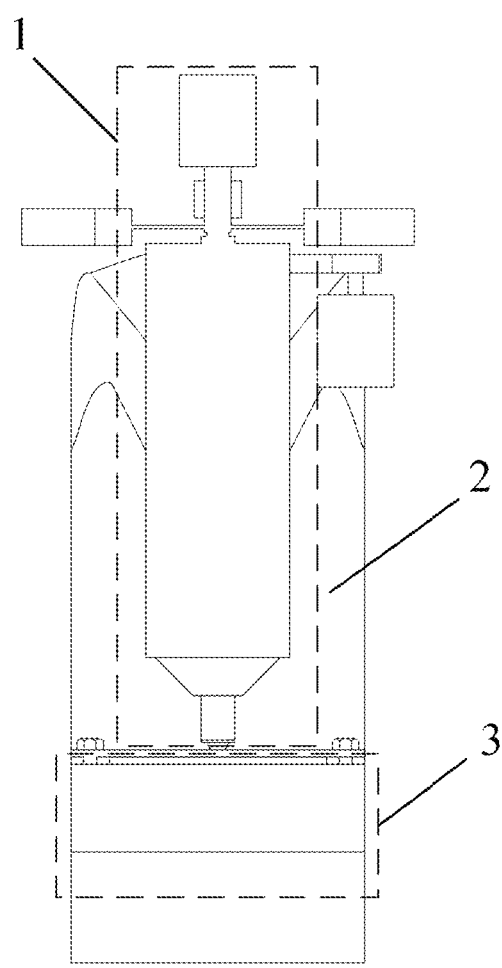
FIG. 4 is a front view of a powder-enhanced friction stir rivet welding device according to an embodiment of the present disclosure.
Figure 5:
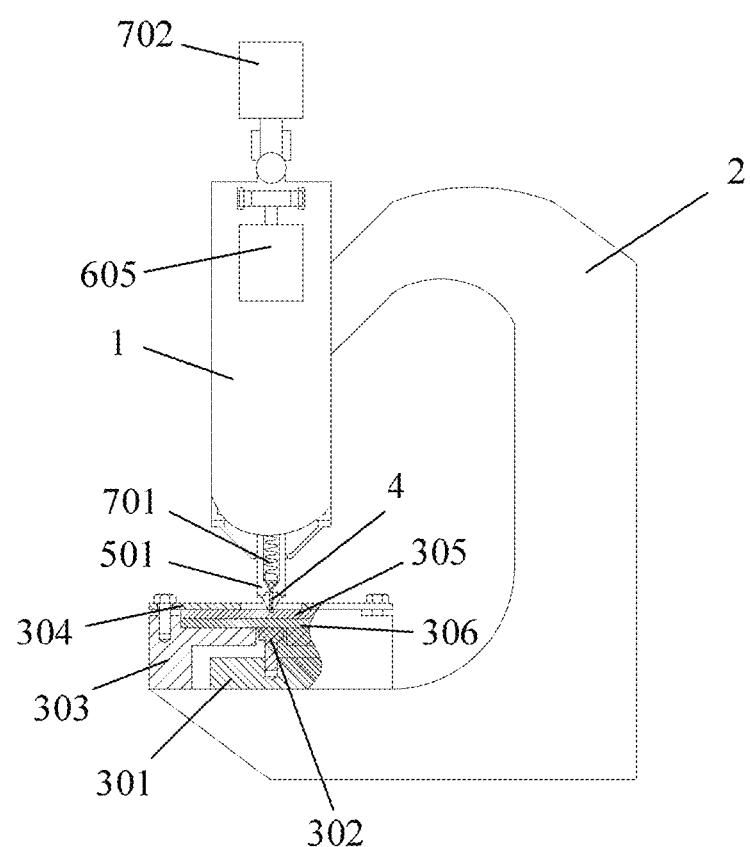
FIG. 5 is a side view of the powder-enhanced friction stir rivet welding device according to an embodiment of the present disclosure.
Figure 6:
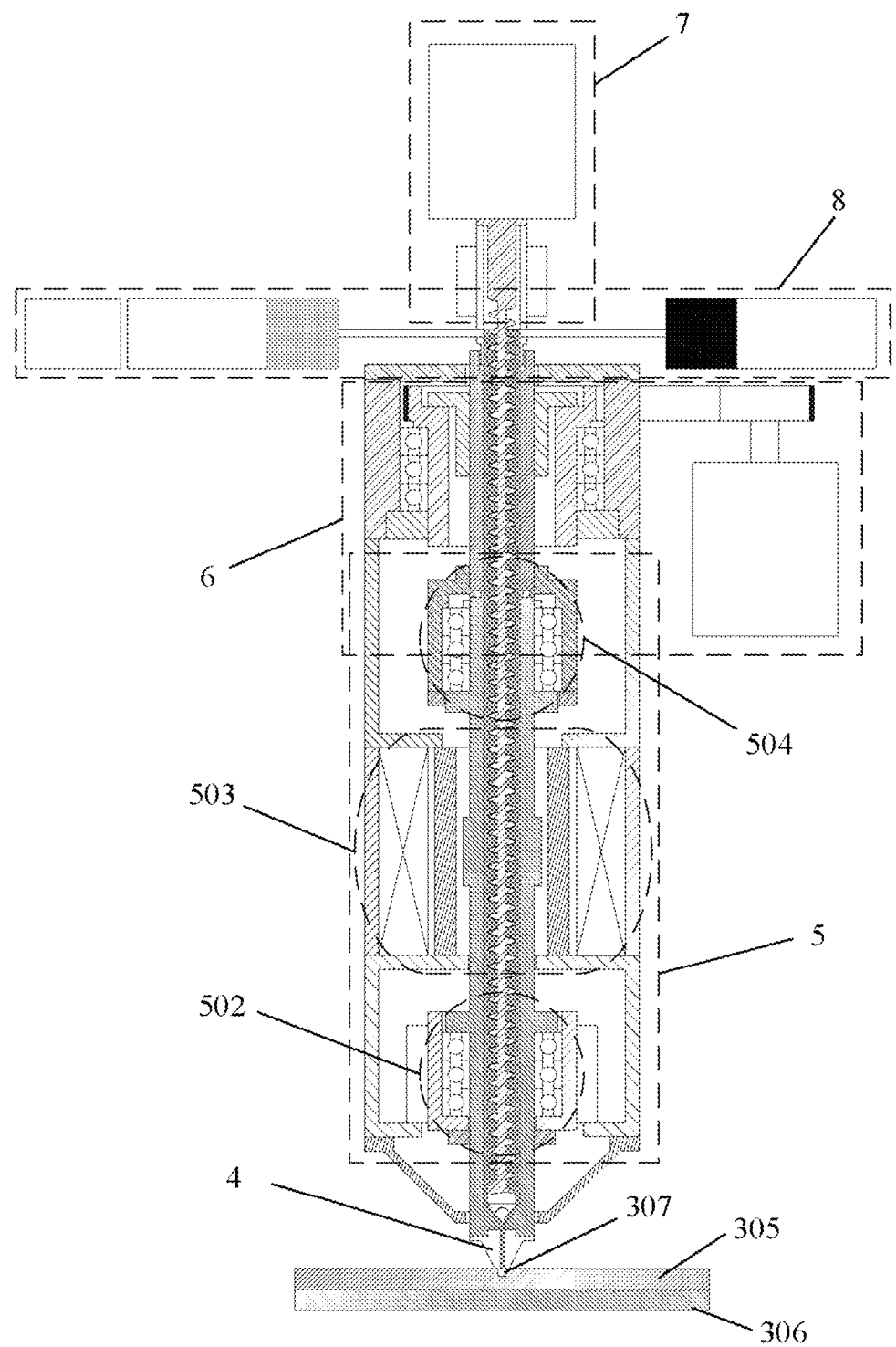
FIG. 6 shows distribution of a friction stir rivet welding spindle according to an embodiment of the present disclosure.

Referring to an embodiment shown in FIGS. 4-6, a powder-enhanced friction stir rivet welding device includes a friction stir rivet welding spindle 1, a C-shaped frame 2 and a tooling platform 3. The friction stir rivet welding spindle 1 is connected to a rivet 4 and is configured to realize rotation and feed movements of the rivet 4 and feeding and mixing of a powder. Specifically, the friction stir rivet welding spindle 1 includes a rotating mechanism 5, a feed mechanism 6, a vibration-rotation mixing mechanism 7 and a powder feeding mechanism 8. The rotating mechanism 5 is connected to the rivet 4 and is configured to realize the rotation movement of the rivet 4. The feed mechanism 6 is configured to realize the feed movement of the rivet 4. The powder feeding mechanism 8 is configured to feed the powder. The vibration-rotation mixing mechanism 7 is configured to mix the powder fed by the powder feeding mechanism 8. The C-shaped frame 2 is configured to fix the friction stir rivet welding spindle 1 and the tooling platform 3. The C-shaped frame 2 is a basic support of the powder-enhanced friction stir rivet welding device. The tooling platform 3 is configured to clamp a point to be riveted and welded, and measure a rivet welding force of the friction stir rivet welding spindle 1 in real time. Specifically, the tooling platform 3 includes a force sensor 301, a sensor indenter 302, a tooling mould 303 and a tooling platen 304. The tooling mould 303 is configured to clamp the workpiece to be riveted and welded. The tooling platen 304 is configured to fix the workpiece to be riveted and welded which is loaded in the tooling mould 303. The force sensor 301 is connected to the sensor indenter 302. The sensor indenter 302 contacts with the workpiece to be riveted and welded to measure the rivet welding force of the friction stir rivet welding spindle 1 in real time.

Specifically, the workpiece to be riveted and welded is a metal plate. In this embodiment, the workpiece to be riveted and welded includes an upper sheet 305 and a lower sheet 306.

Figure 7:
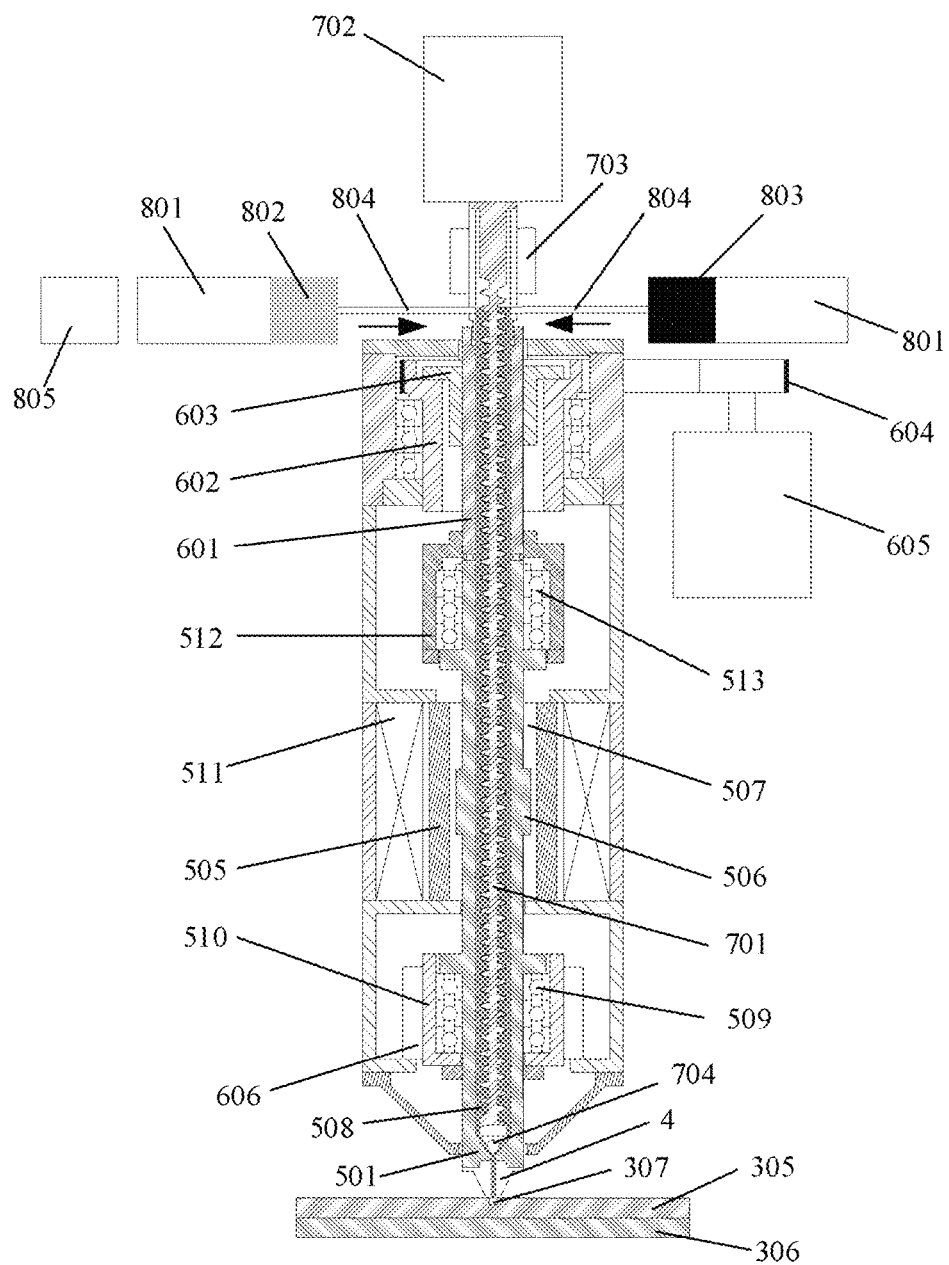
FIG. 7 is a structural diagram of the friction stir rivet welding spindle according to an embodiment of the present disclosure.
Figure 8:
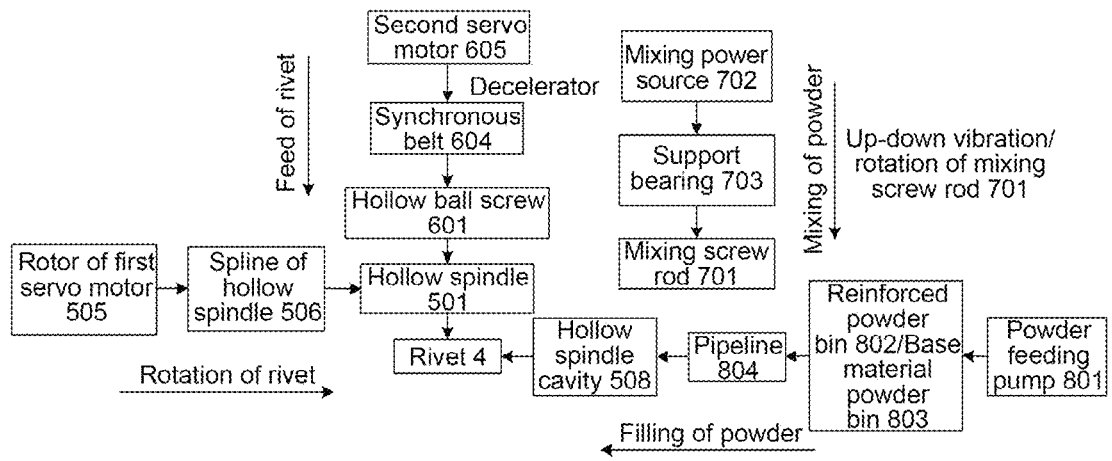
FIG. 8 schematically shows a transmission of the powder-enhanced friction stir rivet welding device according to an embodiment of the present disclosure.
Figure 9:
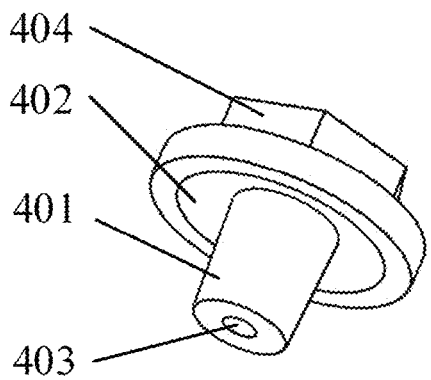
FIGS. 9-16 respectively show geometric structures of a rivet according to an embodiment of the present disclosure.
Figure 10:
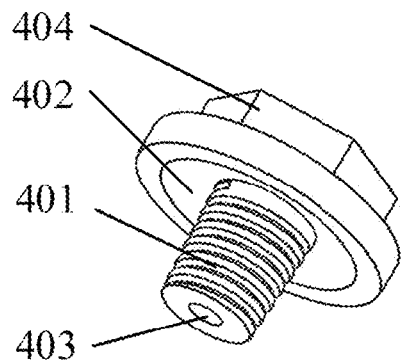
Figure 11:
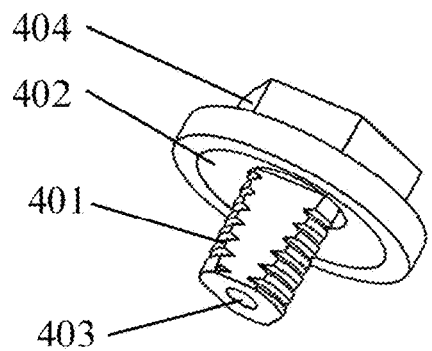
Figure 12:
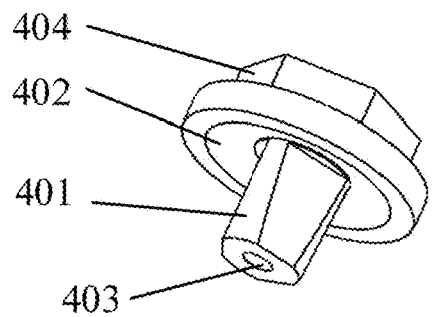
Figure 13:
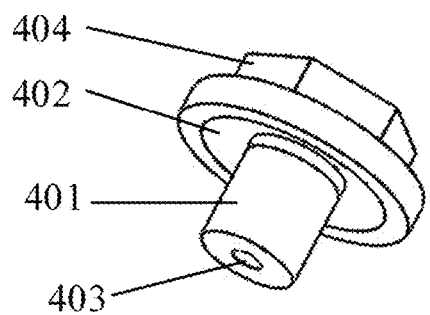
Figure 14:
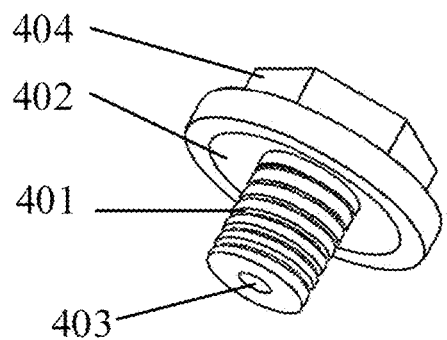
Figure 15:
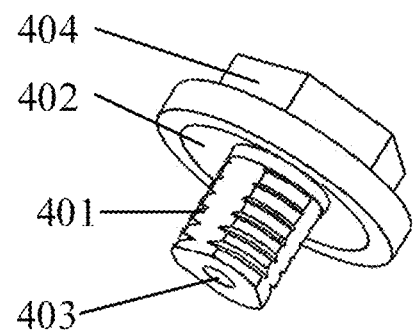
Figure 16:
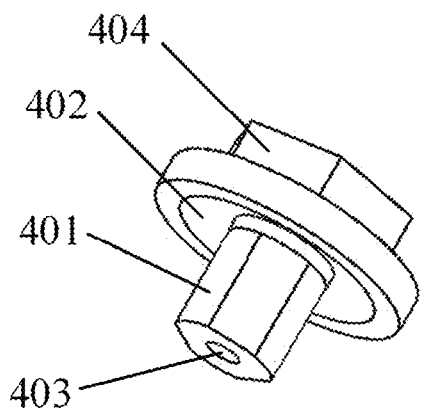
Figure 17:
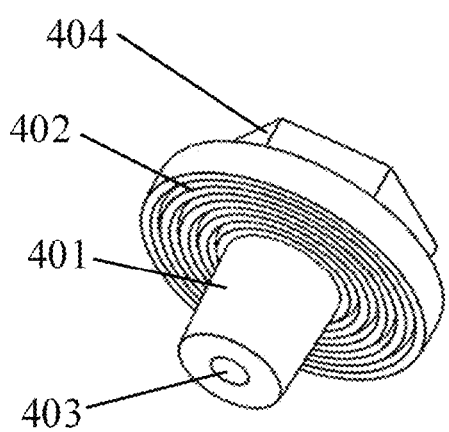
FIGS. 17-20 respectively show geometric structures of a shoulder of the rivet according to an embodiment of the present disclosure.
Figure 18:
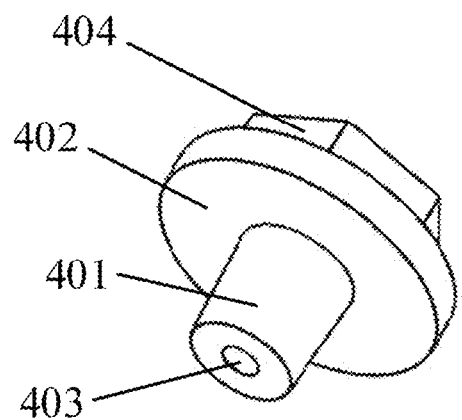
Figure 19:
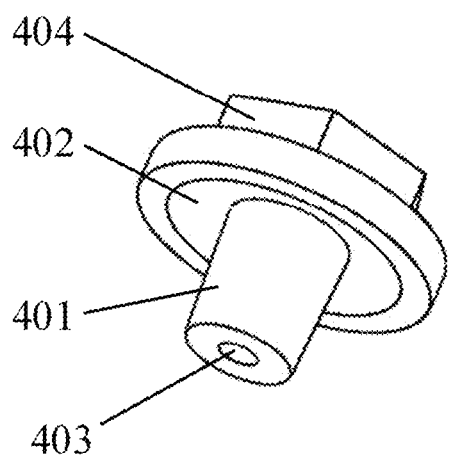
Figure 20:
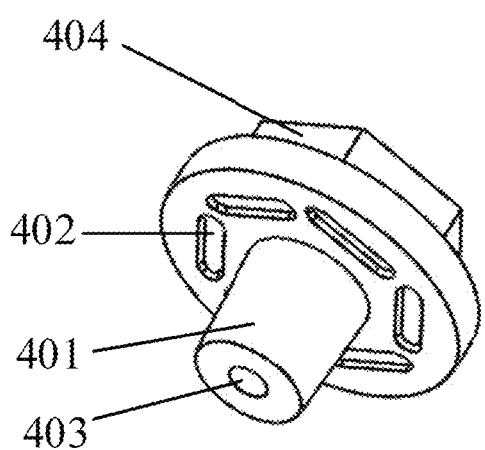

Referring to an embodiment shown in FIGS. 6-8, the rotating mechanism 5 includes a hollow spindle 501, a lower bearing mechanism 502, a first servo motor 503 and an upper bearing mechanism 504. The hollow spindle 501 is mechanically connected to the lower bearing mechanism 502 and the upper bearing mechanism 504. The hollow spindle 501 is fixed in a vertical direction by the lower bearing mechanism 502 and the upper bearing mechanism 504. The hollow spindle 501 is connected to the rivet 4. The hollow spindle 501 rotates along its own axis to realize rotation of the rivet 4. The lower bearing mechanism 502 includes a lower bearing 509 and a lower bearing base 510 for supporting the lower bearing 509. The upper bearing mechanism 504 includes an upper bearing 513 and an upper bearing base 512 for supporting the upper bearing 513. The lower bearing 509 and the upper bearing 513 are configured to support the hollow spindle 501 in the vertical direction and reduce frictional resistance during the rotation of the hollow spindle 501 along its axis, so as to ensure rotation accuracy. The first servo motor 503 is configured to drive the hollow spindle 501 to rotate. The first servo motor 503 is a hollow inner rotor motor, including a rotor 505 and a stator 511. The rotor 505 is provided with a keyway 507. The hollow spindle 501 is provided with a spline 506. The stator 511 can form a first magnetic field after being energized. The rotor 505 in the first magnetic field generated by the stator 511 will generate induced electromotive force to enable the rotor 505 to generate current, thereby forming a second magnetic field around the rotor 505. Under the interaction of the first magnetic field and the second magnetic field, the rotor 505 starts to rotate and is in a spline fit with the hollow spindle 501 for transmission through the keyway 507 to drive the hollow spindle 501 to rotate along its own axis.

The feed mechanism 6 includes a hollow ball screw 601, a screw nut 603, a fixing sleeve 602 of the screw nut 603, a synchronous belt 604, a second servo motor 605 and a lower linear bearing 606. The hollow ball screw 601 and the screw nut 603 are configured for screwed transmission. The fixing sleeve 602 is sleeved outside the screw nut 603. Transmission between the second servo motor 605 and the fixing sleeve 602 is performed by the synchronous belt 604. When the powder-enhanced friction stir rivet welding device performs a feed movement, the second servo motor 605 rotates to drive the fixing sleeve 602 to rotate through the synchronous belt 604. The fixing sleeve 602 rotates to drive the screw nut 603 to rotate, so that the hollow ball screw 601 moves in the vertical direction. At the same time, the hollow ball screw 601 is mechanically connected to the hollow spindle 501 and the upper bearing mechanism 504 of the rotating mechanism 5. The hollow spindle 501 is in spline fit with the rotor 505. The lower linear bearing 606 is provided at an outer side of the lower bearing mechanism 502 of the hollow spindle 501, such that the hollow ball screw 601 drives the hollow spindle 501 to reciprocate in the vertical direction. The lower linear bearing 606 supports the lower bearing mechanism 502 of the hollow spindle 501 in the vertical direction and reduce frictional resistance during the reciprocating movements of the hollow spindle 501 and the lower bearing mechanism 502 in the vertical direction. The friction stir rivet welding spindle 1 is provided with a cavity 508 of the hollow spindle 501.

The vibration-rotation mixing mechanism 7 includes a mixing screw rod 701, a mixing power source 702 and a support bearing 703. The mixing screw rod 701 is provided in the cavity 508 of the hollow spindle 501. The mixing screw rod 701 is configured to mix the powder fed into the cavity 508 of the hollow spindle by the powder feeding mechanism 8 to obtain a mixed powder. The mixing power source 702 is configured to drive the mixing screw rod 701 to operate. The support bearing 703 is configured to support the mixing screw rod 701 and reduce frictional resistance during the operation of the mixing screw rod 701.

Specifically, the vibration-rotation mixing mechanism 7 is configured to perform a vibration mixing and a rotation mixing. When the mixing power source 702 is a vibration exciter, and the support bearing 703 is a linear bearing, the vibration exciter drives the mixing screw rod 701 to reciprocate up and down in a form of high-frequency vibration in the forming process. At the same time, the hollow spindle 501 rotates to realize the vibration mixing of the powder in the cavity 508 of the hollow spindle 501. When the mixing power source 702 is a third servo motor, and the support bearing 703 is a rolling bearing, the third servo motor drives the mixing screw rod 701 to rotate in a direction opposite to a rotation direction of the hollow spindle 501 in the forming process, so as to realize the rotation mixing of the powder in the cavity 508 of the hollow spindle 501.

The powder feeding mechanism 8 includes an air compressor 805, a powder feeding pump 801, a reinforced powder bin 802, a base material powder bin 803 and a pipeline 804. The air compressor 805 is electrically connected to the powder feeding pump 801. In this embodiment, there are two powder feeding pumps 801. The two powder feeding pumps are respectively connected to the reinforced powder bin 802 and the base material powder bin 803. In a friction stir rivet welding process, the air compressor 805 drives the powder feeding pump 801 to feed a reinforced powder in the reinforced powder bin 802 and a base material powder in the base material powder bin 803 into the cavity 508 of the hollow spindle 501 through the pipeline 804.

A powder-enhanced friction stir rivet welding method using the device is performed through the following steps.

(1) Positioning process Referring to an embodiment shown in FIGS. 1 and 7-9, the upper sheet 305 and the lower sheet 306 are fastened by clamping followed by stacking on the tooling mould 303 before a rivet welding is performed, where the tooling mould 303 is fixed. The rivet 4 is matched with a shoulder of the hollow spindle 501 followed by placing on a point to be riveted and welded. The hollow spindle 501 applies a pre-feeding force to the rivet 4 and the point to be riveted and welded under the action of the second servo motor 605. The powder feeding pump 801 feeds the reinforced powder in the reinforced powder bin 803 and the base material powder in the base material powder bin 802 into the cavity 508 of the hollow spindle cavity 501 through the pipeline 804. At the same time, the reinforced powder is mixed with the base material powder in the hollow spindle bin 508 through vertical vibration or rotation of the mixing screw rod 701 under the action of the mixing power source 702, so as to obtain the mixed powder. A center of a lower end of the hollow spindle 501 is provided with a through hole 704 of the hollow spindle 501. The through hole 704 of the hollow spindle 501 is communicated with the cavity 508 of the hollow spindle 501. The through hole 704 of the hollow spindle 501 is configured to output the mixed powder. The rivet 4 is provided with a central through hole 403. The through hole 704 of the hollow spindle 501 is communicated with the central through hole 403, so that the mixed powder are injected into the metal plate to be riveted and welded through the through hole 704 of the hollow spindle 501 and the central through hole 403. A counter bore 307 is pre-processed in a center of the point to be riveted and welded on the upper sheet 305 to ensure the injection of the mixed powder. The counter bore 307 is configured to load the mixed powder output through the cavity 508 of the hollow spindle 501. The powder feeding pump 801 and the vibration-rotation mixing mechanism 7 are always in working state until the rivet welding process is finished.

(2) Friction Preheating Process

Figure 1:
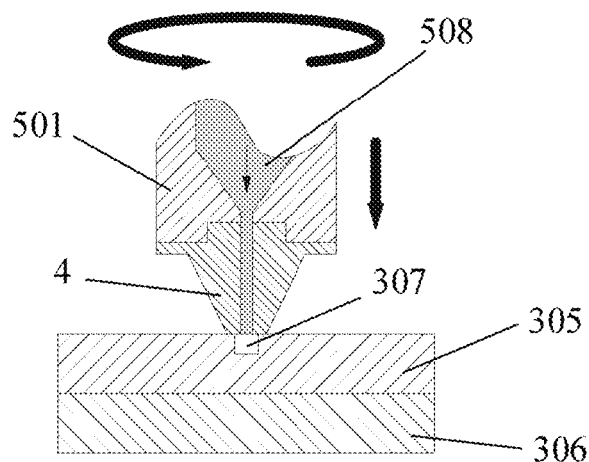
FIG. 1 schematically illustrates a working principle of a friction preheating stage of a powder-enhanced friction stir rivet welding method according to an embodiment of the present disclosure.

Referring to an embodiment shown in FIGS. 1 and 7-8, the rotor 505 of the first servo motor 503 is in a spline fit with the hollow spindle 501 for transmission through the keyway 507 of the rotor 505 of the first servo motor 503 to drive the hollow spindle 501 to rotate along its own axis under the action of the first servo motor 503, such that the rivet 4 performs local friction preheating on the point to be riveted and welded, where a rotating speed of the hollow spindle 501 is 300-2000 r/min and preheating time is 2-10 seconds.

(3) Early Stage of Forming Process

Figure 2:
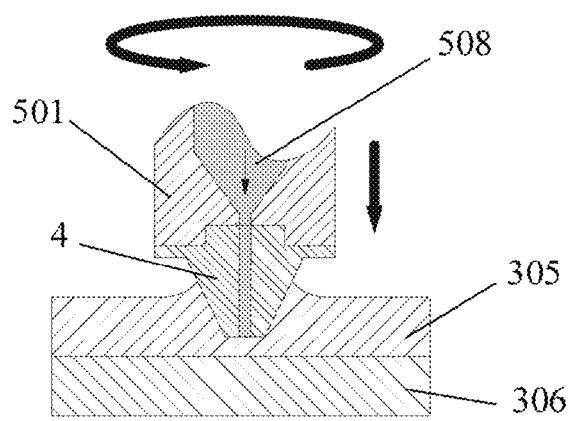
FIG. 2 schematically depicts a working principle of a forming process of the powder-enhanced friction stir rivet welding method according to an embodiment of the present disclosure.

Referring to an embodiment shown in FIGS. 2 and 7-8, the first servo motor 305 keeps rotating after the friction preheating process is finished. The second servo motor 605 drives the hollow ball screw 601 to move downwards, so that the rivet 4 under rotation is inserted into the upper sheet 305, where a feed rate of the rivet 4 is 5-200 mm/min. The mixed powder loaded in the counter bore 307 is fully mixed with a metal material at the point to be riveted and welded under friction stir of the rivet 4, such that the mixed powder and the metal material at the point to be riveted and welded are plasticized under an action of friction heat.

(4) Forming Process

Referring to an embodiment shown in FIGS. 2 and 7-8, the rivet 4 is allowed to continuously move downwards until a shoulder 402 of the rivet 4 is inserted into the upper sheet 305 at a depth of 0.1-0.5 mm. The second servo motor 605 applies an upsetting pressure to the rivet 4 through the hollow ball screw 601 and the hollow spindle 501. The rivet 4 is allowed to continuously rotate to perform friction stir on the point to be riveted and welded for 5-20 seconds using the rivet 4 and shoulder 402 of the rivet 4. Rotation of the first servo motor 503 is stopped after the mixed powder and the metal material at the point to be riveted and welded are fully extruded and mixed. At the same time, the hollow spindle 501 and the rivet 4 also stop rotating. The metal material is naturally cooled for 3-10 seconds to enable the metal material to solidify with the rivet 4 to obtain a rivet welding joint 308, so as to realize powder-enhanced friction stir rivet welding of the upper sheet 305 and the lower sheet 306.

(5) Retract Process

Figure 3:
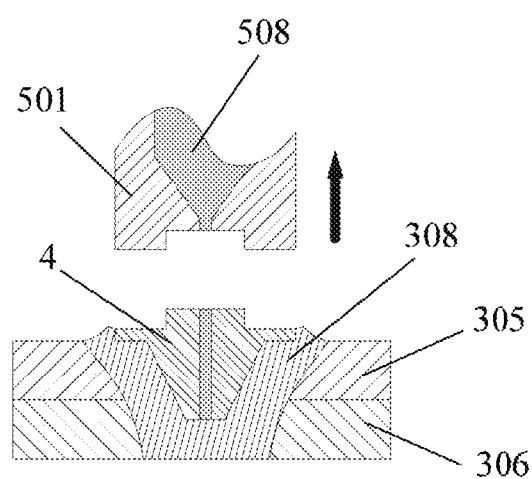
FIG. 3 schematically depicts a working principle of a retract stage of the powder-enhanced friction stir rivet welding method according to an embodiment of the present disclosure.

Referring to an embodiment shown in FIGS. 3 and 7, after the point to be riveted and welded is cooled and solidified, the second servo motor 605 drives the hollow ball screw 601 to move upwards in the vertical direction, so as to drive the hollow spindle 501 to retract to an initial position and finish a friction stir rivet welding process.

Referring to an embodiment shown in FIG. 1, according to connection needs, the upper sheet 305 and the lower sheet 306 are lightweight sheets made of the same material or dissimilar materials. A thickness of the upper sheet 305 is the same as or different from that of the lower sheet 306. If the two sheets are lightweight sheets made of the dissimilar materials, the upper sheet 305 is preferably made of a low-strength material and the lower sheet 306 is preferably made of a high-strength material for friction stir rivet welding. If the two sheets have different thicknesses, the upper sheet 305 is preferred to be thinner than the lower sheet 306.

Referring to an embodiment shown in FIG. 1, a texture and a geometric structure of the rivet and a matching mode between the rivet 4 and the hollow spindle 501 can be adjusted according to the connection needs and use occasions. The rivet 4 is made of die steel, tool steel, high-speed steel or cemented carbide. The rivet 4 includes a stirring pin 401, the shoulder 402 of the rivet 4 and a matching boss 404. The matching boss 404 is connected to the hollow spindle 501. Referring to an embodiment shown in FIGS. 7-16, the stirring pin 401 of the rivet 4 has a conical structure, a conical threaded structure, a three-plane conical threaded structure, a cylindrical structure, a cylindrical threaded structure or a three-plane cylindrical threaded structure. Referring to an embodiment shown in FIGS. 17-20, the shoulder 402 of the rivet 401 has a planar structure, a concave structure, a concentric ring structure or a spiral line structure. The matching boss 404 is matched with the hollow spindle 501 through an in-out hexagonal matching mode or an in-out quincunx matching mode. The matching mode between the matching boss 404 and the hollow spindle 501 preferably has unidirectional rotation, which enables the hollow spindle 501 to be smoothly separated from the rivet 4 during the retract process. That is, after the stirring pin 401 and the shoulder 402 of the rivet 4 are riveted and welded on the upper sheet 305 and the lower sheet 306, the hollow spindle 501 can be smoothly separated from the rivet 4.

The rotation speed, friction heating time, feed speed, press depth and upsetting pressure of the rivet 4 can be respectively adjusted according to the required forming effect. The first servo motor 503 is configured to adjust the rotation speed and the friction heating time. The second servo motor 605 is configured to adjust the feed speed, the press depth and the upsetting pressure.

The reinforced powder is multi-walled carbon nanotube, graphene nanosheet or titanium powder. The base material powder includes a first base material powder and a second base material powder, where a material of the first base material powder is the same as that of the upper sheet 305, and a material of the second base material powder is the same as that of the lower sheet 306. The base material powder has a particle size of 300-2000 mesh, and a volume percentage of the reinforced powder in the mixed powder is 1-10%.

A rotation speed and a vibration frequency of the mixing screw rod 701 and a feed amount and a feed pressure of the reinforced powder and the base material powder can be respectively adjusted according to the required forming effect. The mixing power source 702 is configured to adjust the rotation speed and the vibration frequency of the mixing screw rod 701. The powder feeding pump 801 is configured to adjust the feed amount and the feed pressure of the reinforced powder and the base material powder.

Described above are only preferred embodiments of the present disclosure, which are not intended to limit the scope of the present disclosure. Any changes, modifications and improvements made by those skilled in the art without departing from the spirit of the disclosure shall fall within the scope of the present disclosure.

What is claimed is:

1. A powder-enhanced friction stir rivet welding device, comprising:
    a friction stir rivet welding spindle;
    a C-shaped frame; and
    a tooling platform;
    wherein the friction stir rivet welding spindle comprises a rotating mechanism, a feed mechanism, a vibration-rotation mixing mechanism and a powder feeding mechanism; and the rotating mechanism is configured for rotation of a rivet the feed mechanism is configured for feed movements of the rivet the powder feeding mechanism is configured for powder feeding; and the vibration-rotation mixing mechanism is configured for powder mixing;
    the C-shaped frame is configured to fix the friction stir rivet welding spindle and the tooling platform; and
    the tooling platform comprises a force sensor, a sensor indenter, a tooling mould and a tooling platen; and the tooling platform is configured to clamp a workpiece to be riveted and welded, and measure a rivet welding force of the friction stir rivet welding spindle in real time.

2. The powder-enhanced friction stir rivet welding device of claim 1, wherein the rotating mechanism comprises a hollow spindle, a lower bearing mechanism, a first servo motor and an upper bearing mechanism; and
    the hollow spindle is fixed in a vertical direction by the lower bearing mechanism and the upper bearing mechanism; rotation of the hollow spindle is driven by the first servo motor; the first servo motor is a hollow inner rotor motor; and a rotor of the first servo motor is in a spline fit with the hollow spindle for transmission through a keyway of the rotor of the first servo motor.

3. The powder-enhanced friction stir rivet welding device of claim 2, wherein a feed mechanism comprises a hollow ball screw, a screw nut, a fixing sleeve of the screw nut, a synchronous belt, a second servo motor and a lower linear bearing; and
    transmission between the second servo motor and the fixing sleeve of the screw nut is performed by the synchronous belt; when the powder-enhanced friction stir rivet welding device performs a feed movement, the second servo motor rotates to drive the screw nut to rotate, so that the hollow ball screw moves in the vertical direction; at the same time, the hollow ball screw is mechanically connected to the hollow spindle and upper bearing mechanism of the rotating mechanism; the hollow spindle is in spline fit with the rotor of the first servo motor; and the lower linear bearing is provided at an outer side of the lower bearing mechanism of the hollow spindle, such that the hollow ball screw drives the hollow spindle to reciprocate in the vertical direction.

4. The powder-enhanced friction stir rivet welding device of claim 3, wherein the vibration-rotation mixing mechanism comprises a mixing screw rod, a mixing power source and a support bearing; and the vibration-rotation mixing mechanism is configured to perform a vibration mixing and a rotation mixing; when the mixing power source is a vibration exciter, and the support bearing is a linear bearing, the vibration exciter drives the mixing screw rod to reciprocate up and down in a form of high-frequency vibration; at the same time, the hollow spindle rotates to realize the vibration mixing of a powder in a cavity of the hollow spindle; when the mixing power source is a third servo motor, and the support bearing is a rolling bearing, the third servo motor drives the mixing screw rod to rotate in a direction opposite to a rotation direction of the hollow spindle, so as to realize the rotation mixing of the powder in the cavity of the hollow spindle.

5. The powder-enhanced friction stir rivet welding device of claim 4, wherein a powder feeding mechanism comprises an air compressor, a powder feeding pump, a reinforced powder bin, a base material powder bin and a pipeline; and the air compressor drives the powder feeding pump to feed a reinforced powder in the reinforced powder bin and a base material powder in the base material powder bin into the cavity of the hollow spindle through the pipeline.

6. A powder-enhanced friction stir rivet welding method, comprising:

(1) fastening an upper sheet and a lower sheet by clamping followed by stacking on a tooling mould; matching a rivet with a shoulder of a hollow spindle followed by placing on a point to be riveted and welded; applying a pre-tightening force to the rivet and the point to be riveted and welded through the hollow spindle; transporting a reinforced powder in a reinforced powder bin and a base material powder in a base material powder bin into a cavity of the hollow spindle through a pipeline by using a powder feeding pump; and at the same time, mixing the reinforced powder with the base material powder in the cavity of the hollow spindle through vertical vibration or rotation of a mixing screw rod to obtain a mixed powder;

(2) allowing a rotor of a first servo motor to drive the hollow spindle to rotate, such that the rivet performs local friction preheating on the point to be riveted and welded, wherein the first servo motor is a hollow-shaft servo motor;

(3) keeping the rotor of the first servo motor rotating; driving, by a second servo motor, a hollow ball screw to move downwards, so that the rivet under rotation is inserted into the upper sheet; injecting the mixed powder through a central through hole of the rivet; and fully mixing the mixed powder and a metal material at the point to be riveted and welded under friction stir of the rivet, such that the mixed powder and the metal material at the point to be riveted and welded are plasticized under an action of friction heat;

(4) allowing the rivet to continuously move downwards until a shoulder of the rivet is inserted into the upper sheet; applying, by the second servo motor, an upsetting force to the rivet; allowing the rivet to continuously rotate to perform friction stir on the point to be riveted and welded for 5-20 seconds through the rivet and the shoulder of the rivet; stopping rotation of a first servo motor after the mixed powder and the metal material at the point to be riveted and welded are fully extruded and mixed; and naturally cooling the metal material to enable the metal material to solidify with the rivet to obtain a rivet welding joint, so as to realize powder-enhanced friction stir rivet welding of the upper sheet and the lower sheet; and (5) after the point to be riveted and welded is cooled and solidified, driving, by the second servo motor, the hollow ball screw to move upwards, so as to drive the hollow spindle to retract to an initial position and finish a friction stir rivet welding process.

7. The powder-enhanced friction stir rivet welding method of claim 6, wherein in step (1), a counter bore is pre-processed at a center of the point to be riveted and welded on the upper sheet; and a position of the counter bore corresponds to that of the central through hole of the rivet.

8. The powder-enhanced friction stir rivet welding method of claim 7, wherein the upper sheet and the lower sheet are lightweight sheets made of the same material or dissimilar materials; and a thickness of the upper sheet is the same as or different from that of the lower sheet.

9. The powder-enhanced friction stir rivet welding method of claim 8, wherein the rivet is made of die steel, tool steel, high-speed steel or cemented carbide; a stirring pin of the rivet has a conical structure, a conical threaded structure, a three-plane conical threaded structure, a cylindrical structure, a cylindrical threaded structure or a three-plane cylindrical threaded structure; and a shoulder of the rivet has a planar structure, a concave structure, a concentric ring structure or a spiral line structure.

10. The powder-enhanced friction stir rivet welding method of claim 9, wherein the reinforced powder is multi-walled carbon nanotube, graphene nanosheet or titanium powder; the base material powder comprises a first base material powder and a second base material powder; a material of the first base material powder is the same as that of the upper sheet, and a material of the second base material powder is the same as that of the lower sheet; the base material powder has a particle size of 300-2000 mesh; and a volume percentage of the reinforced powder in the mixed powder is 1-10%.

* * * * *